Dec. 1, 1964     W. F. SCHREIBER     3,159,026
DOUBLE SEAM TIGHTNESS TESTER

Filed Aug. 2, 1960     3 Sheets-Sheet 1

WARREN F. SCHREIBER
INVENTOR.

BY
Mason, Porter, Diller & Stewart
ATTORNEYS.

WARREN F. SCHREIBER
INVENTOR.

BY
Mason, Porter, Diller & Stewart
ATTORNEYS.

United States Patent Office 3,159,026
Patented Dec. 1, 1964

3,159,026
DOUBLE SEAM TIGHTNESS TESTER
Warren F. Schreiber, Darien, Conn., assignor to Continental Can Company, Inc., New York, N.Y., a corporation of New York
Filed Aug. 2, 1960, Ser. No. 47,056
20 Claims. (Cl. 73—83)

This invention relates in general to new and useful improvements in test method and test equipment for determining the tightness of seams, and more particularly relates to a novel method and tester for testing the tightness of double seams, such as are generally found in metal cans.

In the manufacture of metal cans, one end of the can is double seamed onto the can body at the factory, and the other end of the can is double seamed onto the can body at the customer's plant after the can has been filled. If the double seaming operation on either of the two can ends has not been properly executed, the result might be that either or both of the double seams will allow the leakage of the contents of the can outwardly, or, if not, might allow the entrance of air, bacteria, or other contaminants into the can.

The present, commonly used method of determining seam tightness requires that the seam be torn down and that the inside surface of the disengaged hooks be observed and evaluated for the presence of wrinkles. The relative portion of the end hook containing wrinkles is used as a measure of the degree of tightness. The evaluation is subjective rather than objective in that it is dependent upon the ability of an individual to visually estimate the portion of the end hook which is wrinkled. It is recognized that two individuals may view the same seam and differ significantly in their estimation of the seam tightness by this method. It is further recognized that since the evaluation is a visual estimation, it is sometimes difficult for an individual to accurately confirm his own previous evaluation of the seam tightness on a specific can. The can teardown is a very time consuming operation during which the can is destroyed. At the present time it is necessary to cut open and destroy many thousands of cans a day in can manufacturing plants and many thousands of filled cans in food processing plants in order to check the tightness of the double seam.

The presently disclosed invention provides a new method of testing and apparatus for performing the tests which have several outstanding advantages over the above described commonly used method of seam evaluation. The new method as performed with the new apparatus is objective rather than subjective, and provides positive direct readings of seam tightness on a gauge and is thus not dependent upon individual human judgment or estimation.

Any leakage which might occur in a can double seam would of necessity consist of the passage of the product, air, bacteria, or other contaminants through the interstitial clearance between the metal components of the double seam. The new method of testing includes actually measuring the interstitial clearance and therefore is an accurate direct evaluation of potential leakage tendency. By contrast, in the present commonly used method, the length of the wrinkle, which is not a direct indication of the size of the interstitial clearance, is estimated and used as an indication of potential leakage tendency. This fundamental difference between the presently disclosed new method and the common method is considered as a major conrtibution to the art of double seam evaluation.

There are normal variations in the thickness of tinplate used in can making. These variations do not affect the accuracy and validity of the results obtained by the new method of testing. In the presently disclosed method the interstitial clearance is determined by accurately measuring seam thickness at a selected spot before and after compressing out the wrinkles, in the seam end hook, which create the interstitial clearance. In contrast there have been unsuccessful attempts to determine double seam tightness by merely measuring the thickness of the double seam with a micrometer or other measuring device. These attempts were unsuccessful because the normal variation in thickness of tinplate is of such magnitude that a seam which was actually loose to the point of being a potential "leaker" could be indicated as being tight because the tinplate was near the minimum but still within the normal specification for plate thickness.

In view of the foregoing, it is the primary object of this invention to provide a novel method of testing the tightness of seams, such as the double seams between can ends and can bodies. The method includes the steps of determining the thickness of the can seam in its original state and then clamping the seam together at a local spot to remove the interstitial spaces between adjacent layers of the seam, after which a second reading is taken. The amount of interstitial space, which is a measure of the tightness of the seam being tested, is determined by subtracting the second reading from the first reading.

Another object of the invention is to provide a novel double seam tightness tester having an adjustable gauge. The adjustable gauge allows a direct determination of the difference between initial seam thickness and final seam thickness after compressing out wrinkles thus providing a direct reading representing seam tightness rating.

Another object of the invention is to provide a novel double seam tester for testing the tightness of the double seams between can ends and can bodies, the tester being of an extremely simple construction and of a nature whereby the tightness of the double seam may be readily tested without tearing apart the seam, thereby permitting the using of the tested can when the tests show the double seam to be of the desired tightness.

Another object of the invention is to provide a novel double seam tightness tester which operates on the very simple theory of first measuring the total thickness of the double seam, including the interstitial seam spaces, and then locally compressing the double seam to substantially eliminate the interstitial spaces, after which a second measurement is taken. The differences between the first and second measurements gives a substantially accurate measurement of the cumulative transverse seam space width formed between the five layers of metal making up the double seam.

Another object of the invention is to provide a novel tightness tester for double seams, such as double seams between can ends and can bodies, the tightness tester including a pair of opposed jaws between which a seam to be tested may be positioned, and means for first applying a very light clamping force on the seam with the jaws, after which a first reading may be taken, and other means for tightly forcing the clamping jaws together to place a very heavy clamping force on the seam, which clamping force is sufficient to urge the layers of the seam together, after which a second reading may be taken, the differential in the readings indicating the cumulative space between the layers of the seam and accurately defining the tightness of the seam.

A further object of the invention is to provide a novel seam tightness tester which includes a support having a can support depending from one end thereof in position for resting a can in a position with respect to the first mentioned support so that the double seam of the can is engaged by a fixed jaw carried by the first mentioned support, and the first mentioned support also carrying a second jaw which is disposed in opposed relation with respect to the first jaw for clamping a can double seam therebetween, there also being provided first and second spring urged levers connected to the movable jaw for applying the movable jaw on a can double seam at different pressures, the first pressure being relatively light and only sufficient to hold the can in place, and the second clamping force being sufficient to force the layers of the double seam together, whereby the two readings which may be taken with the tester will first indicate the over-all thickness of the seam and secondly the seam with the spaces therein closed up so that the total width of interstitial spaces within the seam may be determined by subtracting the second reading from the first reading, with the amount of interstitial spacing being a determination of the seam tightness.

With the above, and other objects in view that will hereinafter appear, the nature of the invention will be more clearly understood by reference to the following detailed description, the appended claims, and the several views illustrated in the accompanying drawings:

Figure 1:
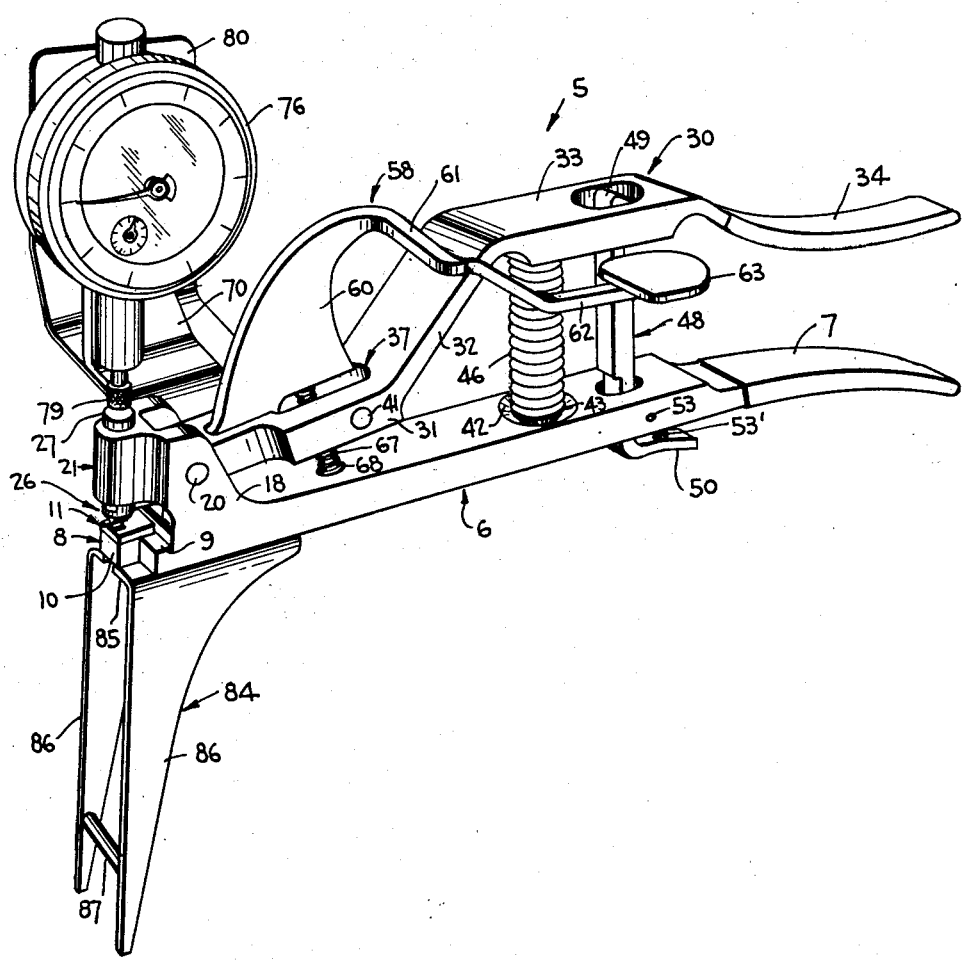
FIGURE 1 is a perspective view of the seam tightness tester, and shows the over-all appearance thereof.
Figure 2:
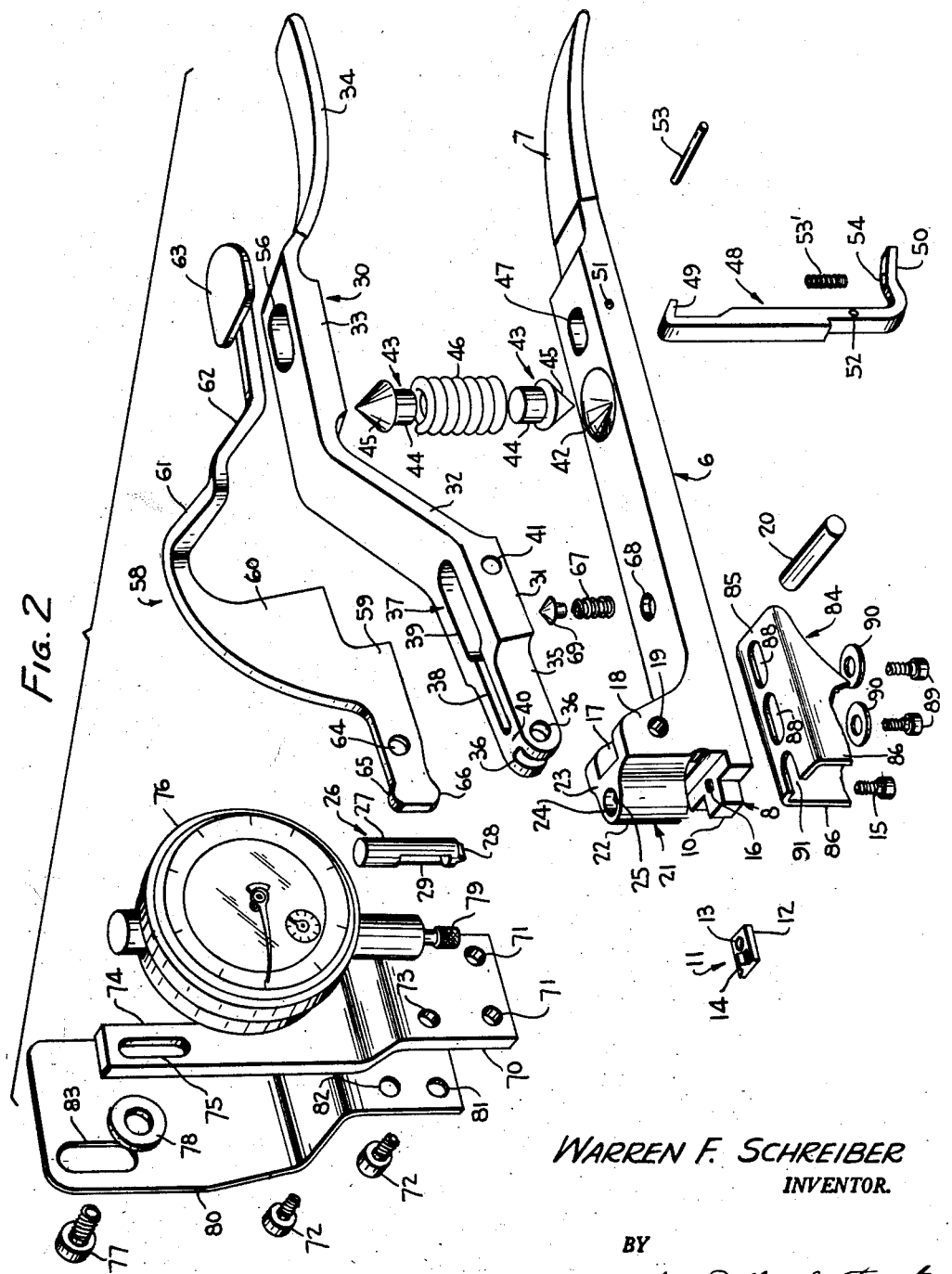
FIGURE 2 is an exploded perspective view of the seam tightness tester of FIGURE 1, and shows the specific details of each of the components thereof.

Reference is now made to the drawings, wherein the seam tightness tester, which is the subject of this invention, is generally referred to by the numeral 5. The seam tightness tester 5 includes an elongated support 6 in the form of a bar. The support 6 has a rear portion which is of a reduced thickness and curved downwardly, the rear portion being in the form of a lower grip handle 7. The forward end of the support 6 terminates in a generally T-shaped projecting portion 8 which is of a reduced thickness. The projecting portion 8 includes a cross-bar part 9 and a projecting stem 10, the stem 10 projecting terminally from the support 6. A lower jaw unit, generally referred to by the numeral 11, is seated on the projecting portion 8. The lower jaw unit 11 includes a mounting plate 12 having a threaded bore 13 in the rear portion thereof. A narrow, line type, lower fixed jaw 14 projects upwardly from the forward portion of the plate 12. The jaw unit 11 is secured in place on the projecting portion 8 of the support 6 by a cap screw 15 which projects upwardly through an opening 16 in the projecting portion 8 and is threaded into the bore 13.

A pair of plates 17, 18 extend upwardly from the support 6 adjacent the projecting portion 8, the plates 17, 18 being disposed in spaced parallel relation and having outer surfaces thereof flush with the side edges of the support 6. The plates 17, 18 have aligned bores 19 in which ends of a pivot pin 20 seat.

A mounting head 21 is carried by the plates 17, 18. The mounting head 21 is generally vertically disposed, and includes a cylindrical portion 22 and a mounting plate portion 23, the mounting plate portion 23 being integrally connected to the side plates 17, 18 and being disposed normal thereto. The mounting plate portion 23 extends between the side plates 17, 18 and together with the side plates 17, 18 defines a channel-shaped support structure. The cylindrical portion 22 is provided with a generally vertical bore 24 therethrough. The mounting plate portion 23 is provided with a vertically extending slot 25 which is disposed intermediate the plates 17, 18 and opens into the bore 24.

An upper and movable jaw unit, generally referred to by the numeral 26, is carried by the mounting head 21. The jaw unit 26 includes an elongated rod 27 which is seated in the bore 24, and a lower jaw element 28. Like the jaw element 14, the jaw element 28 presents a line type contact surface. The jaw elements 14 and 28 are disposed in aligned opposed relation. The rod 27 has an elongated slot 29 extending therethrough, the slot 29 being generally aligned with the jaw element 28 and serves to retain the jaw element 28 in alignment with the jaw element 14 in a manner to be described in detail hereinafter.

A lever, generally referred to by the numeral 30, is pivotally mounted on the pivot pin 20. The lever 30 includes a relatively thick downwardly and forwardly sloping portion 31, a relatively thin upwardly and rearwardly sloping portion 32 integrally connected to the rear part of the portion 31, a relatively thick central portion 33 which is generally disposed parallel to the support 6, and a downwardly and rearwardly curving rear handle or grip forming portion 34. When the lever 30 is mounted on the support 6, the handle portion 34 overlies the handle portion 7 and the two may be gripped in one's hand. If desired, some suitable non-slip covering (not shown) may be applied to the handle portion 7, 34.

The forward portion 31 has an extreme forward part 35 of a reduced width, the width of the part 35 being such as to permit its insertion between the plates 17, 18. The part 35 has a pair of transversely aligned bores 36 which receive the pivot pin 20 and thus serve to pivotally mount the lever 30 with respect to the support 6.

It is to be noted that the forward portion 31 of the lever 30 is of a bifurcated construction and has an elongated slot 37 formed therein. The slot 37 includes a relatively narrow forward portion 38 and a relatively wide rear portion 39. The upper portion of the slot forward portion 38 is bridged immediately rearwardly of the bores 36 by a cross-bar portion 40. A stop pin 41 bridges the slot 37 rearwardly of the forward part 35.

The support 6 has a generally conical seat 42 formed in the upper surface thereof generally in alignment with the forward part of the intermediate portion 33. A similar seat (not shown) is formed in the underside of the intermediate portion 33. A spring fitting 43 is associated with the seat 42. The spring fitting 43 includes a shank 44 and a conical seat engaging head 45 which is of a larger cross-section than the portion 44. The seat engaging head 45 is swively mounted within the seat 42. A second spring fitting 43 is associated with the lever 30. A relatively heavy coil spring 46 is engaged over the two shanks 44 and serves to force the two spring fittings 43 apart. Since the spring fittings 43 engage the support 6 and the lever 30, the spring 46 serves to urge the lever 30 upwardly away from the support 6.

The support 6 has an opening 47 therethrough rearwardly of the seat 42. A latch member, generally referred to by the numeral 48, passes through the opening 47 and is carried by the support 6. The latch member 48 has a hook 49 at the upper end thereof. The lower end thereof terminates in a lever 50 which is disposed generally at right angles to the main portion of the latch member 48. A transverse bore 51 extends through the support 6 in intersecting relation with respect to the opening 47. The lower portion of the latch member 48 has a bore 52. A pivot pin 53 extends through the bores 51, 52 and pivotally mounts the latch member 48 on the support 6. The latch member 48 is urged to a latching position by means of a coil spring 53' which has the lower end thereof seated in a recess 54 formed in the upper surface of the lever 50. The upper end of the coil spring 53' is seated in a recess 55 formed in the underside of the support 6, see FIGURE 3. The spring 53' urges the latch 48 to a latching position with respect to the lever 30.

Figure 3:
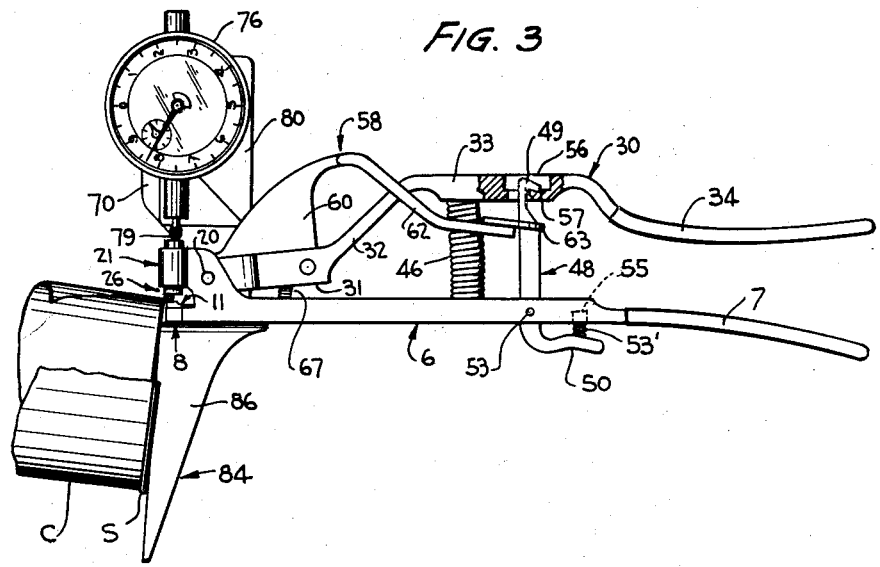
FIGURE 3 is an elevational view of the seam tightness tester on a reduced scale with a can in position relative thereto during a first seam thickness measuring operation, portions of the can being broken away for purposes of clarity.

The intermediate portion 33 of the lever 30 has an opening 56 therethrough. The opening 56 is of a shape to define a seat 57, as is best illustrated in FIGURE 3. The hook 49 is engaged with the seat 57 to latch the lever 30 with respect to the support 6 against the upward urging of the coil spring 46. It is to be noted that the latch member 48 may be moved to a released position with one's forefinger by engaging the lever 50 of the latch member 48 with the forefinger as the handle portions 7, 34 are gripped in one's hand. In this manner, the lever 30 may be unlatched and then slowly released to an operative position due to the urging of the coil spring 46.

A lever, generally referred to by the numeral 58, is also carried by the pivot pin 20. The lever 58 includes an elongated lower forward portion 59 which is integrally connected to a relatively wide upstanding portion 60. The upstanding portion 60 terminates at the upper rear end thereof in an offset intermediate portion 61 which, in turn, terminates in a downwardly and rearwardly directed portion 62. The portion 62 carries a thumb engaging releasing plate 63.

The forward portion 59 has a centrally located opening 64 through which the pivot pin 20 passes. The forward end of the portion 59 is enlarged and includes an upwardly projecting rounded portion 65 and a downwardly projecting rounded portion 66. The portions 65 and 66 are received in the slot 29 and permit relative pivoting between the rod 27 and the lever 58.

It is to be noted that the forward portion 59 of the lever 58 is seated in the slot 37 of the lever 30. The forward portion 59 passes beneath the cross-bar 40 and is received within the slot 29 in the rod 27. In this manner, the lever 58 is pivotally connected to the support 6 and is connected to the jaw unit 26 for raising and lowering the same with respect to the jaw unit 11. Further, since the cross-bar 40 overlies the forward portion 59 of the lever 58, with the engagement of the cross-bar 40 with the forward portion 59 being forwardly of the pivot pin 20, the lever 30 may act upon the jaw unit 26 through the lever 58.

The lever 58 is normally urged to an operative position by a coil spring 67. The coil spring 67 has the lower end thereof seated in a recess 68 formed in the upper surface of the support 6. The upper end of the coil spring 67 is engaged with a fitting 69 which corresponds to one of the fittings 43, but is on a much smaller scale. The fitting 69 engages a seat (not shown) formed on the underside of the intermediate portion 60 of the lever 58. It is also to be understood that the underside of the portion 60 engages the stop pin 41 to limit the downward movement of the lever 58. The purpose of this arrangement will be described in detail hereinafter.

A mounting bracket 70 is secured to the forward portion of the support 6 alongside the plate 17. The lower part of the mounting bracket 70 has a pair of openings 71 therein through which cap screws 72 pass. The cap screws 72 are threaded into the side edge of the support 6. The lower portion of the mounting bracket 70 is also provided with an opening 73 aligned with the bores 19 to facilitate the removal of the pivot pin 20.

The upper portion of the mounting bracket 70 is in the form of an upstanding leg 74 which has a vertically elongated slot 75 formed therein. A dial indicator 76 is secured to the leg 74 by means of a cap screw 77 which extends through the slot 75. A washer 78 is carried by the cap screw 77, and the slot 75 permits the vertical adjustment of the dial indicator 76. It is to be understood that the shape of the mounting bracket 70 and the configuration of the dial indicator 76 is such that an actuating plunger 79 of the dial indicator 76 is aligned with the upper end of the rod 27.

The cap screws 72 also serve to secure a combination guard and rest 80 to the support 6. The lower portion of the combination guard and rest 80 has openings 81 therethrough through which the cap screws 72 pass. The combination guard and rest 80 also has an opening 82 which corresponds to the opening 73 to facilitate the removal of the pivot pin 20. In addition, the upper portion of the combination guard and rest 80 has an enlarged opening 83 through which the cap screw 77 may be tightened and loosened.

Figure 4:
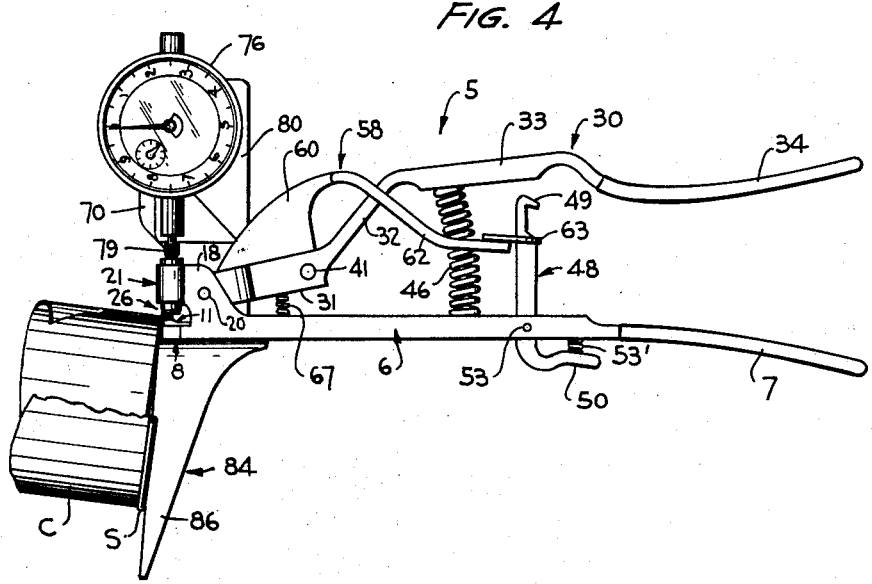
FIGURE 4 is an elevational view like FIGURE 3, and shows the seam tightness tester in position for determining the thickness of the double seam after the layers thereof have been forced together and the interstitial spacings therebetween for all purposes eliminated.

As is best illustrated in FIGURE 1, a can support, generally referred to by the numeral 84, depends from the forward end of the support 6. The can support 84 includes an upper web 85 and a pair of depending legs 86, the legs 86 being generally triangular in outline. The lower ends of the legs 86 are connected together by a transverse brace 87. The forward surfaces of the legs 86, as is best illustrated in FIGURES 3 and 4, slope downwardly and forwardly from the support 6 so that a can engaged with the can support 80 is disposed in angular relation with respect to the axis of the support 6.

It is to be noted that the web 85 of the can support 84 has two elongated slots 88 formed therein, the slots 88 being disposed in longitudinal alignment. A pair of cap screws 89 extend through the slots 88 and are threaded into the underside of the support 6 to adjustably secure the can support 84 to the support 6. Washers 90 are carried by the cap screws 89 and engage the underside of the web 85. The forward part of the web 85 is provided with a cutout 91 to provide clearance for the cap screw 15.

The tester, as illustrated, is equipped with a dial indicator 76 having the face calibrated to the nearest one ten-thousandths of an inch (0.0001″). The tester can be used to provide a numerical tightness reading by either the "direct method" or "difference method." These methods will be further described later. It is to be understood that the dial indicator 76 is provided with a movable face. The outer portion of the face of the dial indicator can thus be turned to a position with the large indicator needle to obtain a zero setting.

The "direct method," which is recommended as the preferred method, measures directly the difference between the seam thickness before and after ironing out the wrinkles. By this method, the final tightness reading is read directly without the need for the subtraction or other calculation. In the event that one is interested in the actual seam thickness before and/or after ironing out the wrinkles, then the "difference method" should be used.

In carrying out the "direct method" of testing, the tester should be initially in the latched position. If it is not, the handles 34 and 7 should be gripped with the right hand to compress the coil spring 46 sufficiently to allow the latch member 48 to seat on the seat 57 in lever 30 putting the tester in the latched position. The movable jaw 26 and the stationary jaw 11 are then separated by depressing the releasing plate 63 with the thumb of the right hand. The double seam of the can being tested is now inserted between the jaws 26 and 11 making certain that the end of the can being tested is in contact with the can support 84. The releasing plate 63 is then gradually released until it is completely released. The dial indicator 76 is now adjusted to a zero setting by moving the zero point of the outer dial face to coincide with the large needle. The latch member 48 is now released from the latched position by pressing the index finger of the right hand against the lever 50 to compress the spring 53′. The handles 34 and 7 are gradually released so as to apply the spring pressure of spring 46 to the movable jaw 26 to compress the double seam. The tester should be allowed to remain in a horizontal position with the dial indicator on top for a set time period in the order of one minute before the dial indicator reading is taken. After the set time period has elapsed, a reading is taken on the dial indicator. This reading is the total width of the interstitial seam spaces of the double seam. After the reading has been taken the handles 34 and 7 are again firmly gripped together in the right hand to engage the latch member 48 with the seat 57 in the lever 30. The can is released from the tester by depressing the releasing plate 63 which causes the jaws 26 and 11 to separate.

In performing the "difference method" of testing, the tester is initially placed in the latched position the same way as described in the "direct method." The dial indicator is now set to the zero position. At this time the jaws 26 and 11 are together. The jaws are now separated by depressing the releasing plate 63 with the thumb of the right hand. The double seam of the can being tested is now inserted between the jaws 26 and 11 making certain that the end of the can being tested is in contact with the can support 84. The releasing plate 63 is then gradually released until it is completely released. A reading of the dial indicator is now taken and recorded. This reading is the actual thickness or width of the double seam. The latch member 48 is now released from the latched position by pressing the index finger of the right hand against the lever 50 to compress the spring 53'. The handles 34 and 7 are gradually released so as to apply the spring pressure of spring 46 to the movable jaw 26 to compress the double seam. The tester should be allowed to remain in a horizontal position with the dial indicator on top for a set time period in the order of one minute before the dial indicator reading is again taken. After the set time period has elapsed, a reading is taken and recorded from the dial indicator. After the reading has been taken the handles 34 and 7 are again firmly gripped together in the right hand to engage the latch member 48 with the seat 57 in the lever 30. The can is released from the tester by depressing the releasing plate 63 which causes the jaws 26 and 11 to separate. The difference between the first reading and final reading is the total width of the interstitial seam spaces of the double seam.

The tightness measure obtained by either the "direct method" or "difference method" of using the tester represents the tightness at the exact spot in the seam where the measurement was made. In general, the tightness around the entire circumference of a seam is reasonably uniform. It is well recognized, however, that the effective tightness of each seam is truly represented by the loosest spot on the circumference of the seam. For this reason the accuracy of determinations are increased as the number of tests increases. It is suggested that two or three tests per double seam be considered average practice.

It is to be understood that the movable portion of the dial indicator face could be provided with colored areas so that when using the direct method of testing the seam would be judged without a numerical reading as either good, acceptable or bad depending on over which colored area the large indicator needle came to rest.

It is further to be understood that although the seam tightness tester, particularly in view of the adaptation of the can support 84 thereto, is particularly intended for testing tightness of double seams found in can constructions, it is also obvious that the seam tightness tester could be used in testing seams to be found in other types of sheet metal workings.

From the foregoing, it will be seen that novel and advantageous provision has been made for carrying out the desired end. However, attention is again directed to the fact that variations may be made in the example apparatus and method of utilizing the same disclosed herein without departing from the spirit and scope of the invention, as defined in the appended claims.

I claim:

1. A seam tightness tester comprising an elongated support, a fixed jaw carried by said support at one end thereof, a movable jaw carried by said support in opposed aligned operational relation to said fixed jaw, first jaw actuating means connected to said movable jaw for effecting a relatively light clamping of a seam between said fixed jaw and said movable jaw, second jaw actuating means connected to said movable jaw for effecting a relatively heavy clamping of the seam between said fixed jaw and said movable jaw and forcing layers of the seam together, and common pivot means connecting said first and second jaw actuating means to said elongated support for movement of said movable jaw away from said fixed jaw when one of said first and second jaw actuating means is moved toward said elongated support.

2. The seam tightness tester of claim 1 wherein said tester is particularly adapted for testing can seams and said support has can support means secured thereto adjacent said fixed jaw for accurately positioning a can seam upon said fixed jaw.

3. The seam tightness tester of claim 1 including an indicator supported from said support and being operable with said movable jaw to indicate the relative positions of said movable jaw whereby the total spacing between the seam layers may be determined to indicate the tightness of the seam, and said indicator being in the form of a dial indicator having a plunger aligned with said movable jaw and engaged thereby during a seam testing operation.

4. The seam tightness tester of claim 1 including spring means for applying forces to said first and second actuating means whereby the clamping pressures exerted by said cooperating movable jaw and fixed jaw are predetermined and the one said jaw actuating means is moved toward said elongated support in a direction opposite to the force applying direction of said spring means to move said movable jaw away from said fixed jaw whereby the clamping pressures between said movable and fixed jaws are relieved.

5. The seam tightness tester of claim 4 wherein said second actuating means has latch means associated therewith to render the same inoperative.

6. A seam tightness tester comprising an elongated support, a fixed jaw at one end of said support, a mounting head at said one support end, a movable jaw aligned with said fixed jaw and carried by said head for movement toward and away from said head, a first lever having one end portion thereof positively connected to said movable jaw for moving said movable jaw and applying a relatively light clamping force on a seam, a second lever being connectable to said movable jaw for applying a relatively heavy clamping force on the seam to effect the forcing together of the layers of the seam, means pivotally connecting said first and second levers to said support and to each other and an indicator supported from said support and being operable by said movable jaw to indicate the relative positions of said movable jaw whereby the total spacing between the seam layers may be determined to indicate the tightness of the seam.

7. The seam tightness tester of claim 6 wherein said tester is particularly adapted for testing can seams and said support has can support means secured thereto adjacent said fixed jaw for accurately positioning a can seam upon said fixed jaw.

8. The seam tightness tester of claim 6 wherein said indicator is in the form of a dial indicator having a plunger aligned with said movable jaw and engaged thereby during a seam testing operation.

9. A seam tightness tester comprising an elongated support, a fixed jaw at one end of said support, a mounting head at said one support end, a movable jaw aligned with said fixed jaw and carried by said head for movement toward and away from said head, a first lever pivotally mounted on said support and having one end portion thereof connected to said movable jaw for moving said movable jaw and applying a relatively light clamping force on a seam, a second lever pivotally mounted on said support and being connectable to said movable jaw for applying a relatively heavy clamping force on the seam to effect the forcing together of the layers of the seam, and an indicator supported from said support and being operable by said movable jaw to indicate the relative positions of said movable jaw whereby the total spacing between the seam layers may be determined to indicate the tightness of the seam and said levers have a common pivot.

10. The seam tightness indicator of claim 6 wherein said levers are spring urged whereby the clamping pressures exerted by said cooperating movable jaw and fixed jaw are predetermined.

11. The seam tightness tester of claim 10 wherein a latch is carried by said support and is engageable with said second lever to render the spring urging means thereof ineffective.

12. A seam tightness tester comprising an elongated support, a fixed jaw at one end of said support, a mounting head at said one support end, a movable jaw aligned with said fixed jaw and carried by said head for movement toward and away from said head, a first lever pivotally mounted on said support and having one end portion thereof connected to said movable jaw for moving said movable jaw and applying a relatively light clamping force on a seam, a second lever pivotally mounted on said support and being connectable to said movable jaw for applying a relatively heavy clamping force on the seam to effect the forcing together of the layers of the seam, and an indicator supported from said support and being operable by said movable jaw to indicate the relative positions of said movable jaw whereby the total spacing between the seam layers may be determined to indicate the tightness of the seam and the connection between said second lever and said movable jaw is through said first lever one end portion and said second lever has a portion for engaging said first lever one end portion.

13. A seam tightness tester comprising an elongated support, a fixed jaw at one end of said support, a mounting head at said one support end, a movable jaw aligned with said fixed jaw and carried by said head for movement toward and away from said head, a first lever pivotally mounted on said support and having one end portion thereof connected to said movable jaw for moving said movable jaw and applying a relatively light clamping force on a seam, a second lever pivotally mounted on said support and being connectable to said movable jaw for applying a relatively heavy clamping force on the seam to effect the forcing together of the layers of the seam, and an indicator supported from said support and being operable by said movable jaw to indicate the relative positions of said movable jaw whereby the total spacing between the seam layers may be determined to indicate the tightness of the seam, and said second lever has a bifurcated end portion and said first lever one end portion passes through said bifurcated end portion, and said first and second levers have a common pivot.

14. A seam tightness tester comprising an elongated support, a fixed jaw at one end of said support, a mounting head at said one support end, a movable jaw aligned with said fixed jaw and carried by said head for movement toward and away from said head, a first lever pivotally mounted on said support and having one end portion thereof connected to said movable jaw for moving said movable jaw and applying a relatively light clamping force on a seam, a second lever pivotally mounted on said support and being connectable to said movable jaw for applying a relatively heavy clamping force on the seam to effect the forcing together of the layers of the seam, and an indicator supported from said support and being operable by said movable jaw to indicate the relative positions of said movable jaw whereby the total spacing between the seam layers may be determined to indicate the tightness of the seam, and the connection between said second lever and said movable jaw is through said first lever one end portion and said second lever has a portion for engaging said first lever one end portion.

15. The seam tightness tester of claim 6 wherein said levers are spring urged whereby the clamping pressures exerted by said cooperating movable jaw and fixed jaw are predetermined, and at least one of said levers has handle means movable toward said support for moving said movable jaw to can releasing positions.

16. A method of determining the tightness of a seam made up of a plurality of layers of material comprising: lightly clamping the seam between a fixed jaw and a movable jaw at a localized point; moving to a zero setting a distance indicating device operatively associated with the movable jaw to sense the position thereof with respect to the fixed jaw; applying pressure on the movable jaw to move it toward the fixed jaw to force the layers of material comprising the seam together; and cause the distance indicating device to assume a new setting, said new setting directly indicating seam tightness.

17. A seam tightness tester comprising an elongated support, a fixed jaw carried by said support at one end thereof, a movable jaw carried by said support in opposed aligned operational relation to said fixed jaw, a first lever and a second lever, means pivotally connecting said first and second levers to said support, said first lever being positively connected to said movable jaw, means coupling said first and second lever for movement of one of said levers upon the movement of another of said levers and spring means between each of said first and second levers and said elongated support for urging said levers away from said support effecting both relatively light and relatively heavy clamping of a can seam.

18. The seam tightness tester as defined in claim 17 wherein each of said first and second levers include first and second end portions, said connecting means pivotally connecting said first and second levers to said support at said one end of said support and said first end portion of said levers, and said spring means being individual springs positioned between said support and the second end portions of said levers for normally urging said second end portions away from said elongated support and thereby moving the movable jaw toward said fixed jaw.

19. The seam tightness tester as defined in claim 18 wherein said second end portion of at least one of said levers is movable toward said support in a direction opposite to the direction of force applied by said springs to said first and second levers to move said movable jaw away from said first jaw.

20. A method of determining the tightness of a seam made up of a plurality of layers of material comprising the steps of moving to a zero setting a distance indicating device operatively associated with a movable jaw, lightly clamping a seam between a fixed jaw and the movable jaw at a localized point to move the distance indicating device to a position indicator of the actual thickness of the seam, and heavily clamping the seam between the fixed jaw and the movable jaw at the localized point to move the distance indicating device to another position indirectly indicating the total width of interstitial seam spacer of the seam.

References Cited in the file of this patent

UNITED STATES PATENTS

| 1,762,497 | Wilson | June 10, 1930 |
| 2,646,627 | Tillyer et al. | July 28, 1953 |
| 2,674,875 | Newman | Apr. 13, 1954 |
| 2,938,377 | Sklar | May 31, 1960 |

FOREIGN PATENTS

| 756,526 | Germany | Oct. 13, 1952 |
| 906,858 | Germany | Mar. 18, 1954 |